(12) United States Patent
Nakahara

(10) Patent No.: US 9,137,706 B2
(45) Date of Patent: Sep. 15, 2015

(54) WIRELESS COMMUNICATION SYSTEM, WIRELESS COMMUNICATION METHOD, AND GATEWAY

(71) Applicant: Hitachi, Ltd., Tokyo (JP)

(72) Inventor: Naruhito Nakahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 417 days.

(21) Appl. No.: 13/669,553

(22) Filed: Nov. 6, 2012

(65) Prior Publication Data

US 2013/0301414 A1 Nov. 14, 2013

(30) Foreign Application Priority Data

Nov. 15, 2011 (JP) ................................. 2011-249789

(51) Int. Cl.
*H04W 28/08* (2009.01)
*H04W 88/16* (2009.01)
*H04W 4/02* (2009.01)
*H04W 88/08* (2009.01)
*H04W 4/00* (2009.01)

(52) U.S. Cl.
CPC ............. *H04W 28/085* (2013.01); *H04W 4/00* (2013.01); *H04W 88/08* (2013.01); *H04W 88/16* (2013.01)

(58) Field of Classification Search
CPC ......... H04W 4/025; H04W 8/02; H04W 8/26; H04W 40/20; H04W 48/20; H04W 76/02; H04W 76/021; H04W 76/022; H04W 88/16
USPC ................... 370/216, 254, 328, 338
See application file for complete search history.

(56) References Cited

U.S. PATENT DOCUMENTS

| 2007/0091862 | A1* | 4/2007 | Ioannidis | 370/338 |
| 2008/0232272 | A1* | 9/2008 | Gelbman et al. | 370/254 |
| 2009/0252133 | A1* | 10/2009 | Watanabe et al. | 370/338 |
| 2010/0061226 | A1* | 3/2010 | Morishige et al. | 370/216 |
| 2010/0208653 | A1* | 8/2010 | Morinaga et al. | 370/328 |

FOREIGN PATENT DOCUMENTS

JP 2009253678 10/2009

OTHER PUBLICATIONS

Hanks et al., "Generic Routing Encapsulation (GRE)," Network Working Group, Request for Comments: 1701, Category: Informational, Oct. 1994.
Farinacci et al., "Generic Routing Encapsulation (GRE)," Network Working Group, Request for Comments: 2784, Category: Standards Track, Mar. 2000.

* cited by examiner

*Primary Examiner* — Un C Cho
*Assistant Examiner* — Jeremy Costin
(74) *Attorney, Agent, or Firm* — Volpe and Koenig, P.C.

(57) ABSTRACT

User traffic transmitted and received by a mobile station is distributed so as not to be converged on a gateway. The gateway includes a signaling processing device and bearer data processing devices, the signaling processing device is concentrated, and the bearer data processing devices are distributed to networks close to base stations. The signaling processing device recognizes, in response to a connection request from each mobile station, a position of the base station covering the mobile station, allocates the bearer data processing device connected to the network close to the base station, and connects the base station to the allocated bearer data processing devices.

13 Claims, 26 Drawing Sheets

| Index | BS IP ADDRESS | AREA |
|---|---|---|
| 1 | 192.168.10.2 | 1 |
| 2 | 192.168.10.7 | 1 |
| : | : | : |
| m | 192.168.20.5 | 2 |

FIG. 4

| AREA | GW-EP IP ADDRESS | STATE |
|---|---|---|
| 1 | 192.168.100.1 | NORMAL |
| 2 | 192.168.200.2 | NORMAL |
| | 192.168.200.2 | FAILURE |
| 3 | 192.168.220.7 | NORMAL |
| ⋮ | ⋮ | ⋮ |
| m | 192.168.250.5 | NORMAL |

FIG. 5

| Index | MS IP ADDRESS | BS IP ADDRESS | Down Link GRE KEY | Up Link GRE KEY | CONNECTION TYPE | HA IP ADDRESS |
|---|---|---|---|---|---|---|
| 1 | 192.10.20.1 | 192.10.10.2 | 0x00010002 | 0xFFFF0001 | Simple IP | – |
| 2 | 192.10.20.5 | 192.10.10.7 | 0x00010005 | 0xFEEE0002 | Mobile IP | 192.10.20.5 |
| : | : | : | : | : | : | : |
| n | 172.20.5.100 | 192.168.100.5 | 0x0031000E | 0x00E10009 | Mobile IP | 172.20.5.100 |

FIG. 6

| Index | THE NUMBER OF DOWN LINK BYTES | THE NUMBER OF UP LINK BYTES | THE NUMBER OF DOWN LINK PACKETS | THE NUMBER OF UP LINK PACKETS |
|---|---|---|---|---|
| 1 | 1034240 | 3855232 | 2020 | 30119 |
| 2 | 51200 | 256000 | 100 | 500 |
| : | : | : | : | : |
| n | 3072000 | 896000 | 6000 | 7000 |

FIG. 8

| Index | BS NETWORK ADDRESS | AREA |
|---|---|---|
| 1 | 192.168.10.0/24 | 1 |
| 2 | 192.168.20.0/24 | 2 |
| : | : | : |
| m | 192.168.25.0/24 | 10 |

FIG.16

| Index | BS IP ADDRESS | GW-EP IP ADDRESS |
|---|---|---|
| 1 | 192.168.10.2 | 192.168.200.10 |
| 2 | 192.168.10.7 | 192.168.200.15 |
| : | : | : |
| m | 192.168.100.5 | 192.168.200.50 |

FIG. 19

| Index | BSID | GW-EP IP ADDRESS |
|---|---|---|
| 1 | 123456789012 | 192.168.200.10 |
| 2 | 123456789013 | 192.168.200.15 |
| : | : | : |
| m | 123456789014 | 192.168.200.50 |

FIG. 21

PRIOR ART

PRIOR ART

WIRELESS COMMUNICATION SYSTEM, WIRELESS COMMUNICATION METHOD, AND GATEWAY

CLAIM OF PRIORITY

The present application claims priority from Japanese patent application JP 2011-249789 filed on Nov. 15, 2011, the content of which is hereby incorporated by reference into this application.

BACKGROUND OF THE INVENTION

1. Field of the Invention

The present invention relates to a wireless communication system, a wireless communication method, and a gateway, and more particularly to a wireless communication system such as a mobile communication system, a wireless communication method such as a mobile communication system, and a distributed gateway used in the wireless communication system such as the mobile communication system, which enhance a load distribution effect of a communication network.

2. Background Art

In general, a mobile communication system has a hierarchical structure. A WiMAX system will be described as an example of the mobile communication system having the hierarchical structure.

FIG. 23 is a diagram illustrating an outline of the WiMAX system.

The WiMAX system includes a mobile station (MS) 700, a base station (BS) 600, a BS 601, a BS 602, an access service network gateway (ASN-GW) 100 that manages the BSs, and a connectivity service network (CSN) 400. The CSN 400 has authentication, authorization, and accounting (AAA) related to accounting and authentication. Also, the CSN 400 has a home agent (HA) in a system that supports an IP. When the CSN 400 provides an internet service, the CSN 400 is connected to an internet 500.

The WiMAX system has a hierarchical structure in which the plurality of BS 600, BS 601, and BS 602 are connected to the ASN-GW 100 through a network 5002, a network 5003, and a network 5001. One of reasons that the mobile communication system has the hierarchical structure resides in the mobility realization of the MS 700. For example, let us consider a case in which the MS 700 travels from the BS 600 to the BS 601. The BS 600 of a travel source and the BS 601 of a travel destination are consolidated in the identical ASN-GW 100, to thereby realize handover in which the ASN-GW 100 detects the travel of the MS 700, and continues service.

FIG. 25 is a diagram illustrating a connection sequence of the WiMAX specified by WiMAX Forum of a standards body.

The MS 700, the BS 600, the ASN-GW 100, and the CSN 400 exchange messages with each other in conformity with the provision (800 to 821), and establish a radio path 822 between the MS 700 and the BS 600, and a generic routing encapsulation (GRE) capsuling path 823 between the BS 600 and the ASN-GW 100. When the MS 700 accesses to the internet, the MS 700 transmits user data to the BS 600 as radio data 7100. The BS 600 transfers the received user data to the ASN-GW 100 as GRE capsuling data 7101. Further, the ASN-GW 100 transfers the user data to the CSN 400, and the CSN 400 transfers the user data to the internet 500.

FIG. 26 is a diagram illustrating a GRE packet format of the GRE capsuling data between the BS and the ASN-GW. A GRE packet includes an IP header 7050, a GRE header 7051, and user data 7052. The user data 7052 is an IP packet transmitted by the MS 700. IP addresses of the BS 600 and the ASN-GW 100 are stored in the IP header 7050, and used as communication addresses of the BS 600 and the ASN-GW 100 which terminate a GRE tunnel. A GRE KEY specified in, for example, an RFC 2784 GRE and an RFC 1701 GRE is included in the GRE header 7051, and used to identify the MS 700.

In the mobile system thus stratified, the user data communicated by the MS 700 passes through the BS 600 via a radio zone as the radio data 7100, passes through the network 5002 and the network 5001 between the BS 600 and the ASN-GW 100, and arrives at the CSN 400 through the ASN-GW 100. The CSN 400 transfers the user data to the internet 500 according to routing.

FIG. 24 is a functional schematic diagram of the ASN-GW in the WiMAX system.

Also, the WiMAX Forum specifies that a function of the ASN-GW is divided into a function of processing signaling and a function of processing bearer data in a form illustrated in FIG. 24. A function unit for processing signaling is called "ASN-GW decision point 200", and a function unit for processing the bearer data is called "ASN-GW enforcement point 300".

As a related art, JP-A-2009-253678 proposes a method in which a load of a device is checked and allocated as an allocation method to the bearer data processing function.

SUMMARY OF THE INVENTION

In the above-mentioned related art mobile communication system, because a hierarchical network is applied, a plurality of base stations are intensively connected to the ASN-GW 100. For that reason, data communicated by a large number of MSs behind the plurality of BSs is multiplexed every time the data passes through the networks 5002 and 5003, further multiplexed by the network 5001 that bundles the networks together to arrive at the ASN-GW 100, and is converged. That is, a data traffic volume is increased more as the data comes closer to the ASN-GW 100. It is assumed that the increase in the data traffic presses a network capacity with the development of the mobile communication and an increase in the capacity of the content in recent years, and needs for decreasing a network load are demanded. Also, JP-A-2009-253678 has proposed that the signaling function unit and the bearer data function unit are separated from each other, and the bearer data function unit checks the amount of load of the bearer data function unit, and allocates the load to users. However, although the load of the bearer data function unit within the device can be distributed, a data traffic load of the overall network cannot be distributed. When the ASN-GWs are simply distributed as a solution, it is assumed that handover across the ASN-GWs frequently occurs, and the amount of signaling for handover is increased. As a result, service may be discontinued in a system applying no mobile IP.

The present invention has been made in view of the above, and one object of the present invention is to distribute a network load by terminating bearer data by a bearer data processing device arranged in a network close to a base station, and transferring the bearer data to an internet connected to the same network. Another object of the present invention is to process handover as handover within a gateway for the base station by converging signaling processing devices.

In order to achieve the above object, according to the present invention, there is provided a mobile communication system having a hierarchical structure such that a plurality of base stations are connected to a gateway through networks, and each of the plurality of base stations communicates with a plurality of mobile stations, in which the gateway includes a signaling processing device and bearer data processing devices, the signaling processing device is concentrated, and the bearer data processing devices are distributed to the networks close to the base stations. The signaling processing device of the gateway determines, in response to a connection request from each mobile station, the bearer data processing device connected to the network close to the base station covering the mobile station according to a position of the base station, and connects the base station to the determined bearer data processing device. Also, with the provision of a plurality of the bearer data processing devices within an area of each network, when a certain bearer data processing device is in failure, another bearer data processing device which is not in failure is specified, and notified the base station of.

According to the first solving means of the present invention, there is provided a wireless communication system comprising a hierarchical structure such that a plurality of base stations are connected to a gateway through a network, and each of the plurality of base stations communicates with a plurality of wireless terminals, wherein the gateway includes a signaling processing device for processing signaling, and one or a plurality of bearer data processing devices for processing bearer data, the plurality of base stations, the network, and one or a plurality of the bearer data processing devices are defined as one area, one signaling processing device is concentrated for a plurality of the areas, the signaling processing device includes a position management table indicating which area each of the base stations is located in, and which area the bearer data processing devices are set with respect to the areas in which the respective base stations are located, the signaling processing device allocates the bearer data processing device to the area in which the base station is located in response to a connection request from any one of the wireless terminal, each of the bearer data processing devices has an information table that stores wireless terminal addresses, base station addresses, and capsulation key information necessary for encapsulating and decapsulating in association with each other, each of the bearer data processing devices is located on the basis of the area in which the base stations are located, and communicates the bearer data with one or the plurality of base stations within the area, each of the base stations transmits the connection request including base station identification information to the signaling processing device according to a request from the wireless terminal, upon receiving the connection request, the signaling processing device refers to the position management table, and executes bearer data processing device search processing for specifying a bearer data processing device address of the bearer data processing device connected to the base station on the basis of the base station identification information included in the connection request, the signaling processing device transmits an address to be allocated to the wireless terminal to the base station, the signaling processing device transmits the bearer data processing device address of the bearer data processing device specified by the bearer data processing device search to the base station, the signaling processing device and the bearer data processing device exchange the capsulation key information necessary for encapsulating and decapsulating between the base station and the bearer data processing device, the signaling processing device transmits a setup request including the wireless terminal address, the base station address, and the capsulation key address to the bearer data processing device in which the capsulation key information is specified by the bearer data processing device search, and the bearer data processing device sets the wireless terminal address, the base station address, and the capsulation key information to the information table according to the setup request received from the signaling processing device, and completes a connection of a capsulation path between the base station and the bearer data processing device.

According to the second solving means of the present invention, there is provided a wireless communication method in a wireless communication system comprising a hierarchical structure such that a plurality of base stations are connected to a gateway through a network, and each of the plurality of base stations communicates with a plurality of wireless terminals, wherein the gateway includes a signaling processing device for processing signaling, and one or a plurality of bearer data processing devices for processing bearer data, the plurality of base stations, the network, and one or a plurality of the bearer data processing devices are defined as one area, one signaling processing device is concentrated for a plurality of the areas, the signaling processing device includes a position management table indicating which area each of the base stations is located in, and which area the bearer data processing devices are set with respect to the areas in which the respective base stations are located, the signaling processing device allocates the bearer data processing device to the area in which the base station is located in response to a connection request from any one of the wireless terminal, each of the bearer data processing devices has an information table that stores wireless terminal addresses, base station addresses, and capsulation key information necessary for encapsulating and decapsulating in association with each other, each of the bearer data processing devices is located on the basis of the area in which the base stations are located, and communicates the bearer data with one or the plurality of base stations within the area, each of the base stations transmits the connection request including base station identification information to the signaling processing device according to a request from the wireless terminal, upon receiving the connection request, the signaling processing device refers to the position management table, and executes bearer data processing device search processing for specifying a bearer data processing device address of the bearer data processing device connected to the base station on the basis of the base station identification information included in the connection request, the signaling processing device transmits an address to be allocated to the wireless terminal to the base station, the signaling processing device transmits the bearer data processing device address of the bearer data processing device specified by the bearer data processing device search to the base station, the signaling processing device and the bearer data processing device exchange the capsulation key information necessary for encapsulating and decapsulating between the base station and the bearer data processing device, the signaling processing device transmits a setup request including the wireless terminal address, the base station address, and the capsulation key address to the bearer data processing device in which the capsulation key information is specified by the bearer data processing device search, and the bearer data processing device sets the wireless terminal address, the base station address, and the capsulation key information to the information table according to the setup request received from the signaling processing device, and completes a connection of a capsulation path between the base station and the bearer data processing device.

According to the third solving method of the present invention, there is provided a gateway in a wireless communication system comprising a hierarchical structure such that a plurality of base stations are connected to the gateway through a network, and each of the plurality of base stations communicates with a plurality of wireless terminals, wherein the gateway includes a signaling processing device for processing signaling, and one or a plurality of bearer data processing devices for processing bearer data, the plurality of base stations, the network, and one or a plurality of the bearer data processing devices are defined as one area, one signaling processing device is concentrated for a plurality of the areas, the signaling processing device includes a position management table indicating which area each of the base stations is located in, and which area the bearer data processing devices are set with respect to the areas in which the respective base stations are located, the signaling processing device allocates the bearer data processing device to the area in which the base station is located in response to a connection request from any one of the wireless terminal, each of the bearer data processing devices has an information table that stores wireless terminal addresses, base station addresses, and capsulation key information necessary for encapsulating and decapsulating in association with each other, each of the bearer data processing devices is located on the basis of the area in which the base stations are located, and communicates the bearer data with one or the plurality of base stations within the area, from each of the base stations, the connection request including base station identification information is transmitted to the signaling processing device according to a request from the wireless terminal, upon receiving the connection request, the signaling processing device refers to the position management table, and executes bearer data processing device search processing for specifying a bearer data processing device address of the bearer data processing device connected to the base station on the basis of the base station identification information included in the connection request, the signaling processing device transmits an address to be allocated to the wireless terminal to the base station, the signaling processing device transmits the bearer data processing device address of the bearer data processing device specified by the bearer data processing device search to the base station, the signaling processing device and the bearer data processing device exchange the capsulation key information necessary for encapsulating and decapsulating between the base station and the bearer data processing device, the signaling processing device transmits a setup request including the wireless terminal address, the base station address, and the capsulation key address to the bearer data processing device in which the capsulation key information is specified by the bearer data processing device search, and the bearer data processing device sets the wireless terminal address, the base station address, and the capsulation key information to the information table according to the setup request received from the signaling processing device, and completes a connection of a capsulation path between the base station and the bearer data processing device.

It is possible, according to the present invention, to distribute a network load by terminating bearer data by a bearer data processing device arranged in a network close to a base station, and transferring the bearer data to an internet connected to the same network. Also, it is possible, according to the present invention, to process handover as handover within a gateway for the base station by converging signaling processing devices.

BRIEF DESCRIPTION OF THE DRAWINGS

FIG. 4 is a diagram illustrating an example of a BS position management table according to an embodiment of the present invention;

FIG. 5 is a diagram illustrating an example of a position management table in the bearer data processing device;

FIG. 6 is a diagram illustrating an example of an information table necessary for bearer data assembly and disassembly in the bearer data processing device;

FIG. 8 is a diagram illustrating an example of a table storing statistical information necessary for accounting in the bearer data processing device;

FIG. 16 is a diagram illustrating an example of the BS position management table according to an embodiment of the present invention;

FIG. 19 is a diagram illustrating an example of the BS position management table according to an embodiment of the present invention;

FIG. 21 is a diagram illustrating an example of the BS position management table according to an embodiment of the present invention;

DETAILED DESCRIPTION OF THE PREFERRED EMBODIMENTS

A. First Embodiment

Hereinafter, a description will be given of a WiMAX system according to an embodiment of the present invention.

1. System

Figure 1:
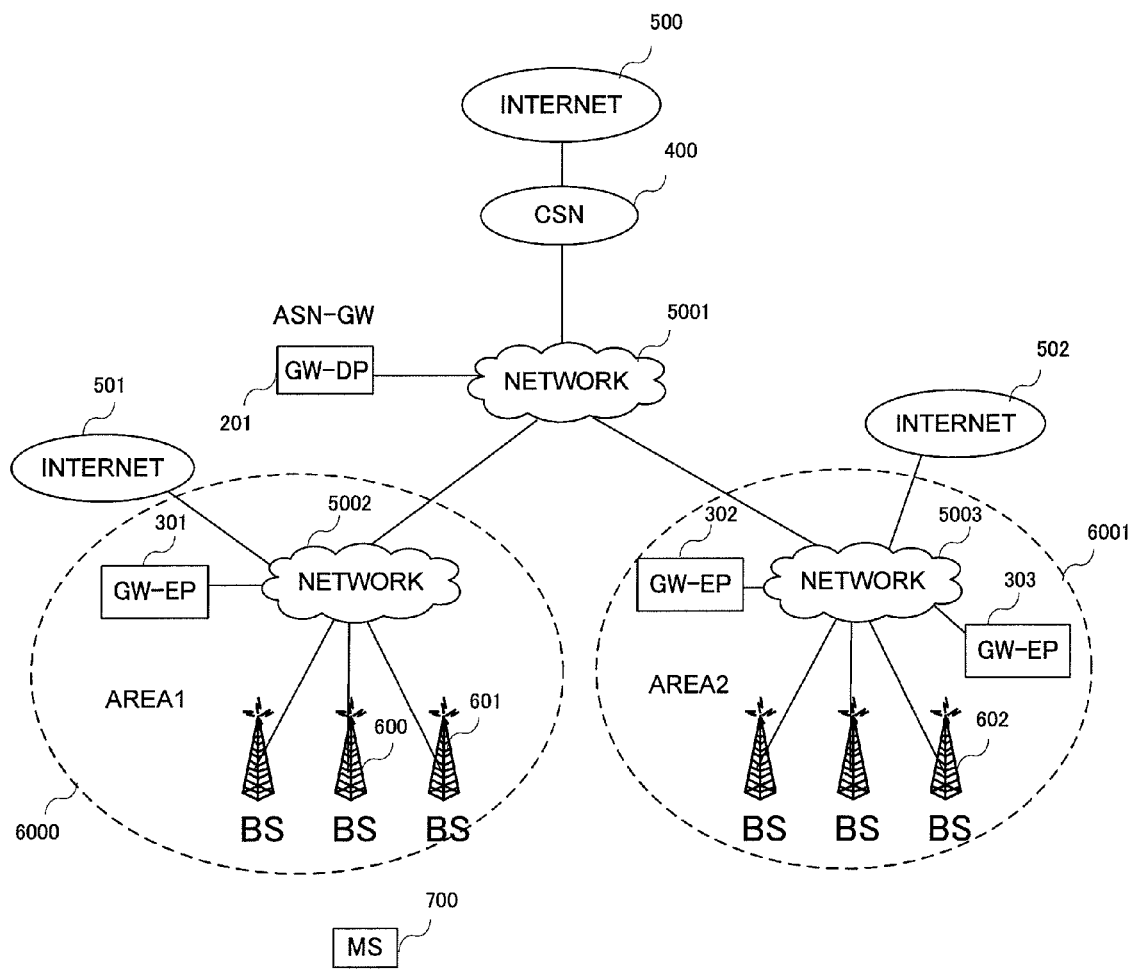
FIG. 1 is a diagram illustrating a mobile communication system according to an embodiment of the present invention.

FIG. 1 is a diagram illustrating a configuration of a WiMAX system according to this embodiment.

The WiMAX system according to this embodiment includes an MS 700, a BS 600, a BS 601, a BS 602, a GW-EP 301, a GW-EP 302, and a GW-EP 303 which are bearer data processing units of an ASN-GW, a GW-DP 201 which is a signaling function unit of the ASN-GW, a CSN 400, an internet 500, an internet 501, an internet 502, and a network 5001, a network 5002, and a network 5003 which are connected with devices. The GW-DP 201, the GW-EP 301, the GW-EP 302, and the GW-EP 303 are characteristic configurations of this embodiment. Also, as characteristic definitions of this embodiment, it is assumed that the GW-EP 301, the BS 600, the BS 601, and the network 5002 are in an area 1, and the GW-EP 302, the GW-EP 303, the BS 602, and the network 5003 are in an area 2.

Figure 2:
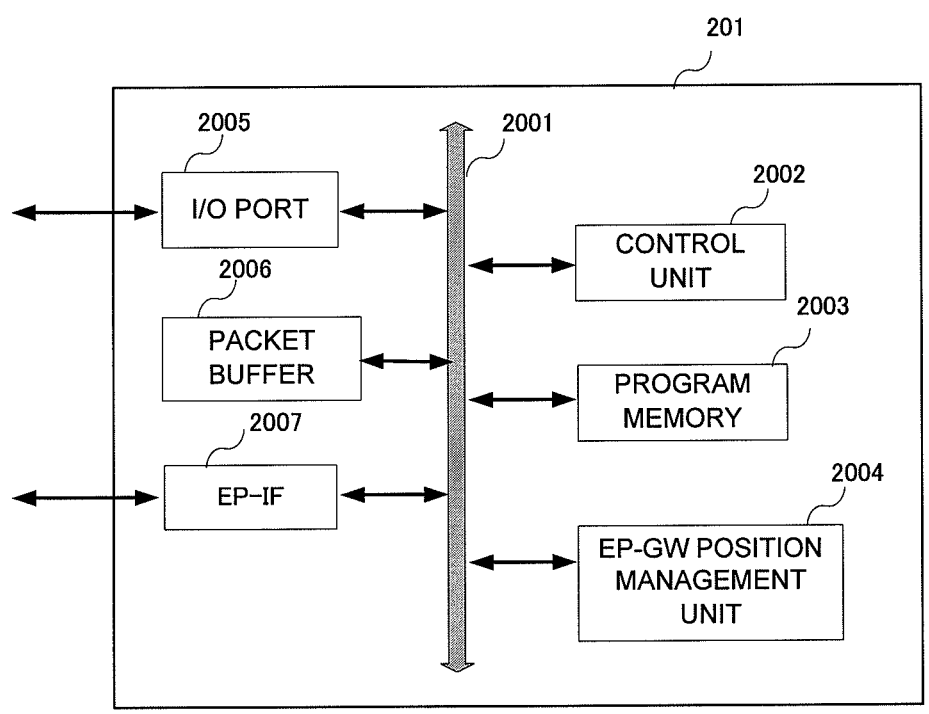
FIG. 2 is a configuration diagram of a signaling processing device according to an embodiment of the present invention.

FIG. 2 is a diagram illustrating a configuration of the GW-DP 201 according to the embodiment of the present invention.

The GW-DP 201 includes an I/O port 2005 having a physical interface connected to the BSs and the CSN, a packet buffer 2006 that stores data received from the I/O port 2005 therein, a control unit 2002 that decrypts the received data to create an appropriate response message, a program memory 2003 in which software is stored, a GW-EP position management unit 2004 that manages position information on the BS and the GW-EP, and an EP-IF 2007 that communicates with the EP-GW.

FIGS. 4 and 5 illustrate an example of a table stored in the EP-GW position management unit 2004. The table of FIG. 4 includes an index, a BS IP address, and an area, and the area in which the BSs are located is specified and set in advance. A table of FIG. 5 includes an area, a GW-EP IP address, and a state. The state is information such as a flag showing an IP address of the GW-EP set within the area and a state of the GW-EP are normal, or failure.

Figure 3:
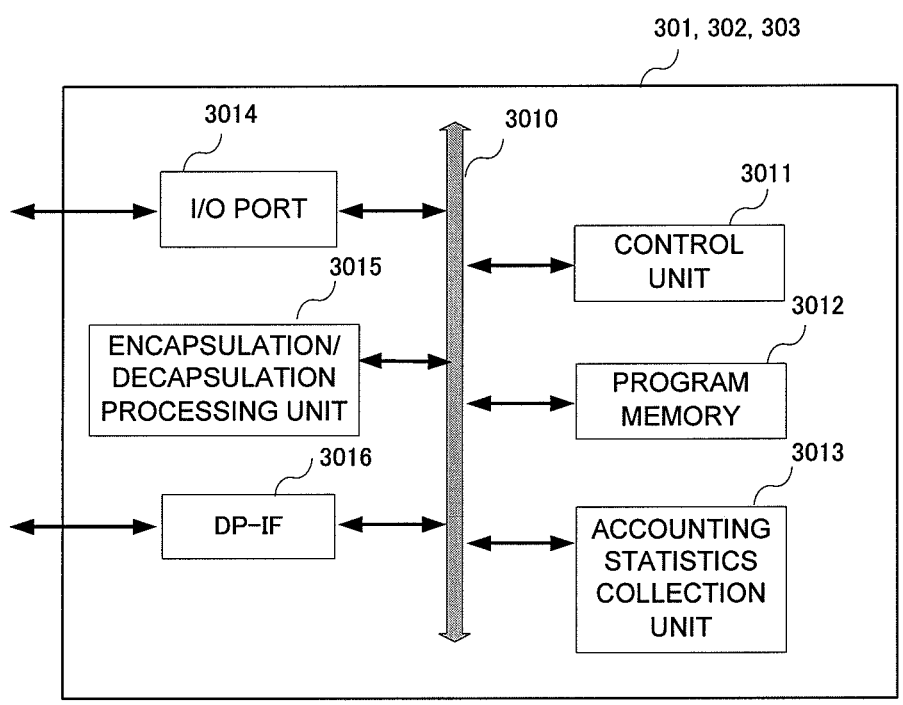
FIG. 3 is a configuration diagram of a bearer data processing device according to an embodiment of the present invention.

FIG. 3 is a diagram illustrating configurations of the GW-EP 301, the GW-EP 302, and the GW-EP 303 according to the embodiment of the present invention. Each of the GW-EP 301, the GW-EP 302, and the GW-EP 303 includes an I/O port 3014 having a physical interface that connects the BS and the CSN to each other, an encapsulation/decapsulation processing unit 3015 that dissembles and assembles data received from the I/O port 3014, a control unit 3011 that instructs and sets information necessary for the disassembly and assembly of the data, a program memory 3012 in which software is stored, an accounting statistics collection unit 3013 that stores statistics data that are an accounting base, a DP-IF 3016 that provides a notice to the GW-DP, and a bus 3010 that connects the respective function units to each other.

FIG. 6 illustrates an example of a table stored in the encapsulation/decapsulation processing unit 3015. The table of FIG. 6 includes an index, an MS IP address, a BS IP address, a down link GRE KEY, an up link GRE Key, and a connection type. Further, the table can include an index, an HA IP address, an SPI, and an MIP KEY necessary for a mobile IP connection.

FIG. 8 illustrates an example of a table stored in the accounting statistics collection unit 3013. The table includes an index, the number of down link bytes, the number of up link bytes, the number of down link packets, and the number of up link packets.

2. Connection Sequence

Subsequently, a connection sequence according to this embodiment will be described.

Figure 9:
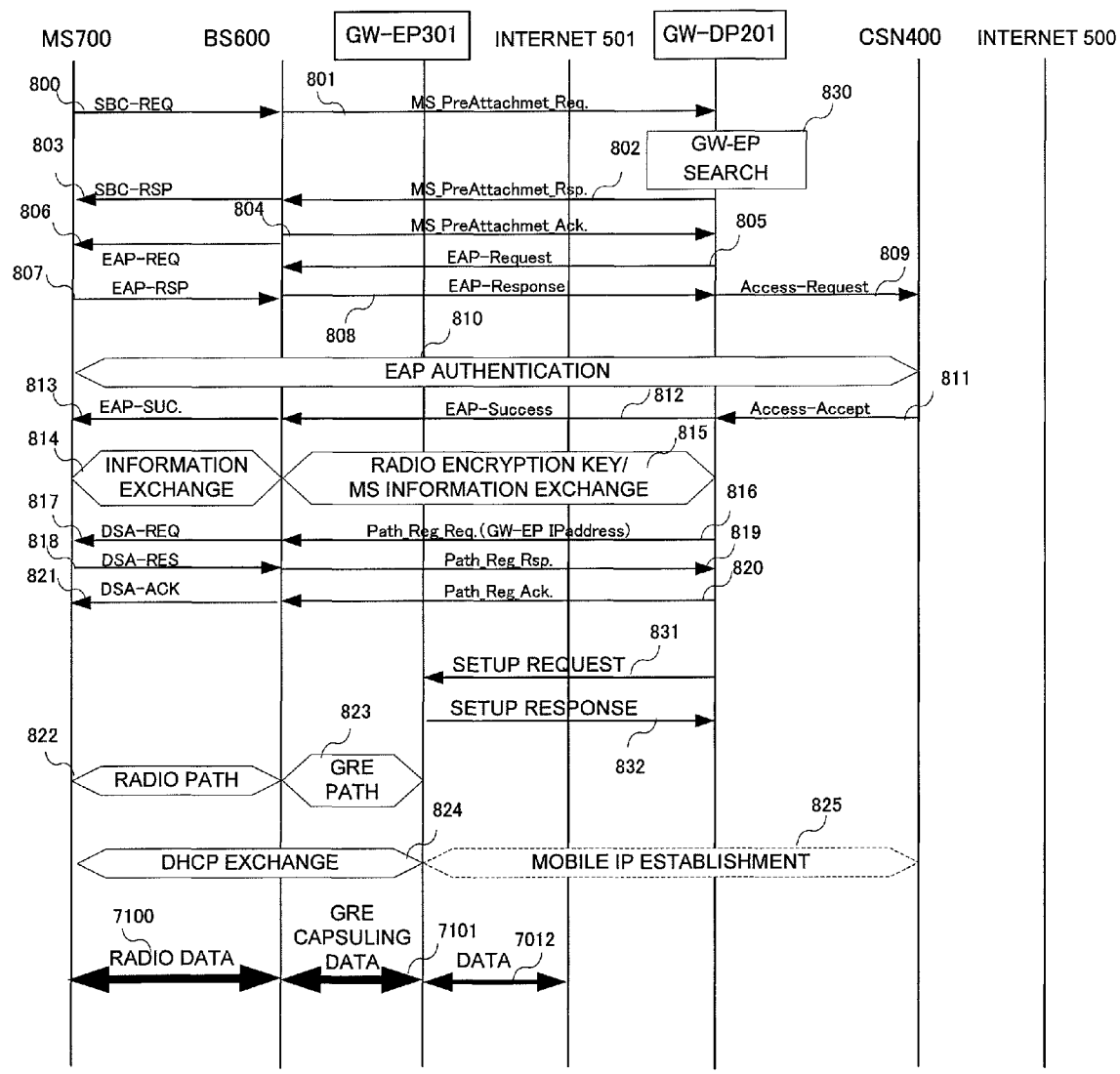
FIG. 9 is a sequence diagram illustrating connection processing according to an embodiment of the present invention.

FIG. 9 is a diagram illustrating an example of a procedure for determining the allocation of the GW-EPs in the connection sequence.

The MS 700 transmits an SBC-REQ 800 that is a connection request to the BS 600 when making a request for connection. The BS 600 that has received the SBC-REQ 800 transmits MS_PreAttachment_Req. 801 corresponding to the connection request to the GW-DP 201. Upon receiving the MS_PreAttachment_Req. 801, the GW-DP 201 specifies the GW-EP suitable for connection to the BS 600 that has transmitted the MS_PreAttachment_Req. 801 with the use of the tables of FIGS. 4 and 5 in the EP-GW position management unit 2004 of FIG. 2.

Figure 10:
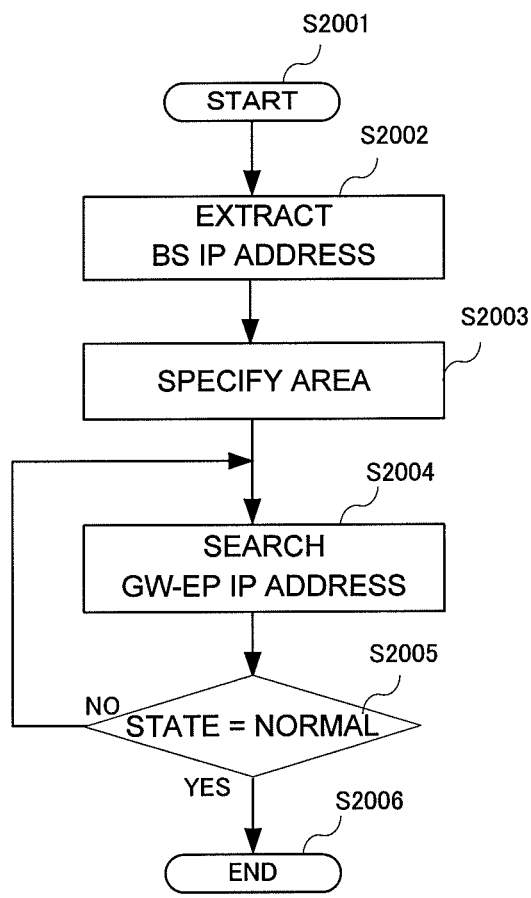
FIG. 10 is a flowchart illustrating allocation processing in the bearer data processing device according to an embodiment of the present invention.

FIG. 10 is a flowchart illustrating processing for specifying the GW-EP suitable for the BS 600 that has transmitted the request for connection.

Upon receiving the MS_PreAttachment_Req. 801, the control unit 2002 starts steps in FIG. 10, and allows the operation to proceed to Step S2002. In Step 2002, the control unit 2002 specifies an IP address of the BS. A source IP address included in an IP header of the MS_PreAttachment_Req. 801 is the IP address of the BS. Upon specifying the BS IP address, the control unit 2002 allows the operation to proceed to Step 2003. In Step 2003, an area in which the BS is located is specified with the use of the table of FIG. 4. First, the control unit 2002 searches the BS IP address extracted in Step 2002 from a BS IP address column of the table. An area column on the same row as that of the matched index is the area in which the BS is located. For example, if the BS IP address of the extracted BS 600 is 192.168.10.2, it is found that the index matches an index 1, and an area thereof is 1. After specifying the area, the control unit 2002 allows the operation to proceed to Step 2004. In Step 2004, the control unit 2002 specifies the IP address of the suitable GW-EP with the use of the table in FIG. 5. The control unit 2002 searches the area specified in Step 2003 from an area row, and acquires the GW-EP IP address on the matched row. In the case of the area 1 in the above-mentioned example, 192.168.100.1 becomes the GW-EP IP address. After acquiring the GW-EP IP address, the control unit 2002 allows the operation to proceed to Step 2005. In this Step 2005, the control unit 2002 determines whether a state of the GW-EP IP address acquired in Step 2004 is normal, or failure. If failure, the operation is returned to Step 2004, and the control unit 2002 searches another GW-EP IP address. If the state is normal, the control unit 2002 returns the operation to Step 2006, and completes the operation.

Returning to FIG. 9, when GW-EP search processing 830 is completed, the GW-DP 201 transmits a response message MS_PreAttachment_Rsp 802 responsive to the MS_PreAttachment_Req. 801 to the BS 600. The BS 600 transmits a MS_PreAttachment_Ack 804 to the GW-DP 201 as a response to reception of the response message MS_PreAttachment_Rsp 802. Upon receiving the MS_PreAttachment_Ack 804, the GW-DP 201 transmits an EAP-Request 805 to the BS 600 for conducting authentication. Upon receiving the EAP-Request 805, the BS 600 transfers the EAP-Request 805 to the MS 700 as an EAP-REQ 806, and thereafter transmits an EAP-RSP 807 response from the MS 700 to the GW-DP 201 as an EAP-Response 808.

An network access identifier (NAI) called "identity" is included in the EAP-Response 808. Upon receiving the EAP-Response 808, the GW-DP 201 extracts the NAI. The NAI has a format of user@Domain, and a domain to which the MS 700 joins can be known by viewing the domain. The GW-DP 201 determines a connection type (simple IP or mobile IP) for each of the domains in advance, and further extracts the domain from the extracted NAI. The GW-DP 201 knows the domain from the extracted domain, and determines whether the connection type of the MS 700 that has made the request for connection is the simple IP, or the mobile IP. After determination of the connection type, the GW-DP 201 transmits an Access-Request 809 to an authentication server set within the CSN 400. Thereafter, an EAP authentication 810 is conducted between the authentication server and the MS 700, and if authentication results are successful, an Access-Accept 811 is transmitted to the GW-DP 201 from the authentication server. The Access-Accept 811 includes an IP address to be allocated to the MS 700. After receiving the Access-Accept 811, the GW-DP 201 extracts the IP address to be allocated to the MS 700, stores the IP address in the GW-DP 201, and thereafter transmits the IP address to the BS 600 as an EAP-Success 812. Further, the BS 600 transmits an EAP-SUC 813.

After that, signals necessary for connection are exchanged between the BS 600 and the GW-DP 201 in conformity with the connection sequence specified by the WiMAX Forum (information exchange 814, radio encryption key/MS information exchange 815). With advancing of the processing, the GW-DP 201 transmits a Path_Reg_Req. 816 to the BS. The Path_Reg_Req. 816 specifies that the IP address of the GW-EP specified by GW-EP search processing 830 can be allocated. In the above-mentioned example, the GW-DP 201 notifies the BS 600 of 192.168.100.1. Upon receiving the Path_Reg_Req. 816, the BS 600 transmits a Path_Reg_Rsp. 819 which is a response message to the GW-DP 201. The GW-DP 201 transmits a Path_Reg_Ack 820 as a response to reception of the Path_Reg_Rsp. 819. In the Path_Reg_Req. 816 and the Path_Reg_Rsp. 819, GRE KEY information necessary for encapsulating and decapsulating is exchanged between the BS 600 and the GW-EP 301.

Figure 13:
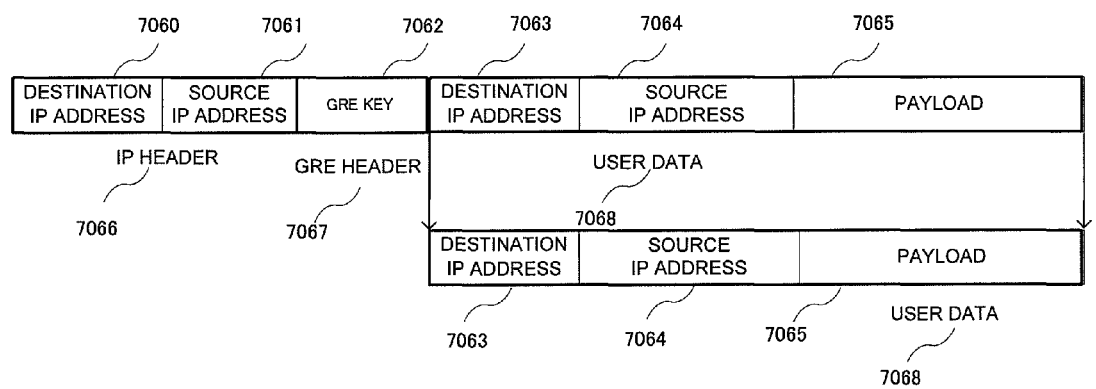
FIG. 13 is a diagram illustrating decapsulation processing.

FIG. 13 is a diagram illustrating decapsulation processing. The GRE KEY is a KEY stored in a GRE header of a packet format illustrated in FIG. 13, which is an identifier that specifies the MS.

The GW-DP 201 transmits a setup request 831 to the GW-EP 301 in which the GRE KEY information is specified by the GW-EP search processing 830.

Figure 12:
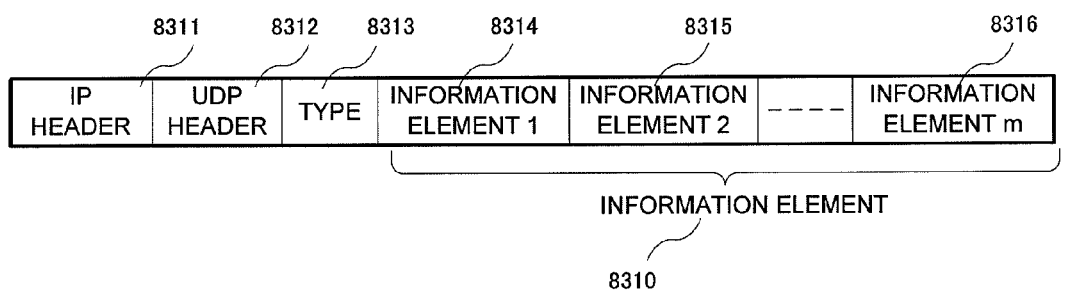
FIG. 12 is a diagram illustrating a format example of a setup request to the bearer data processing device.

FIG. 12 illustrates an example of a format of the setup request.

The setup request includes an IP header 8311, an UDP header 8312, a type 8313, and one or a plurality of information elements 8310. The type 8313 is used for distinguishing the setup request 831 and a setup response 832. The information elements 8310 include information set from the GW-DP to the GW-EP. In the first embodiment, elements of the MS IP address, the BS IP address, the down link GRE KEY, and the up link GRE KEY are included as the information elements of the setup request 831. Also, if the information terminal is a system that supports the mobile IP, an HA IP address and the connection type (simple IP or mobile IP) necessary for the mobile IP can be also included.

The GW-EP 301 receives the setup request 831 transmitted from the GW-DP 201 from the DP-IF 3016 of FIG. 3. The received message is decrypted by the control unit 3011, and the MS IP address, the BS IP address, the down link GRE KEY, the up link GRE KEY, and the connection type are set to blank indexes of the table in FIG. 6, of the encapsulation/decapsulation processing unit 3015. If the HA IP address, the SPI, and the MIP KEY are included in the information element for the mobile IP, the control unit 3011 sets the mobile IP for the connection type, and also sets values thereof. If no information related to the mobile IP is included in the information element for the simple IP, the control unit 3011 sets the simple IP for the connection element. Upon finishing setting for the respective tables, the GW-EP 301 creates the setup response 832, and transmits the setup response 832 to the GW-DP 201.

Returning to FIG. 9, upon completing the setting for the GW-EP 301, a GRE capsuling path 823 is completed between the BS 600 and the GW-EP 301. Thereafter, a DHCP exchange 824 is conducted, and the GW-DP 201 notifies the MS 700 of the IP address to be allocated to the MS 700, which is extracted and stored when receiving the Access-Accept 811, and completes the connection. When supporting the mobile IP, the GW-DP 201 establishes the HA and a mobile IP 825 set in the CSN 400.

Subsequently, the routing operation of the user data will be exemplified by a case in which the MS 700 accesses to the internet. The MS 700 transmits the user data from the MS 700 toward a destination of the internet for connection to the internet. The user data arrives at the BS 600 through a radio zone. The BS 600 conducts GRE encapsulating on the user data with the use of the GRE KEY of the GRE capsuling path established by the above-mentioned connection sequence, and transmits the user data to the GW-EP 301 as GRE capsuling data 7101. Upon receiving the GRE capsuling data from the I/O port 3014, the GW-EP 301 transfers the GRE capsuling data to the encapsulation/decapsulation processing unit 3015.

Figure 11:
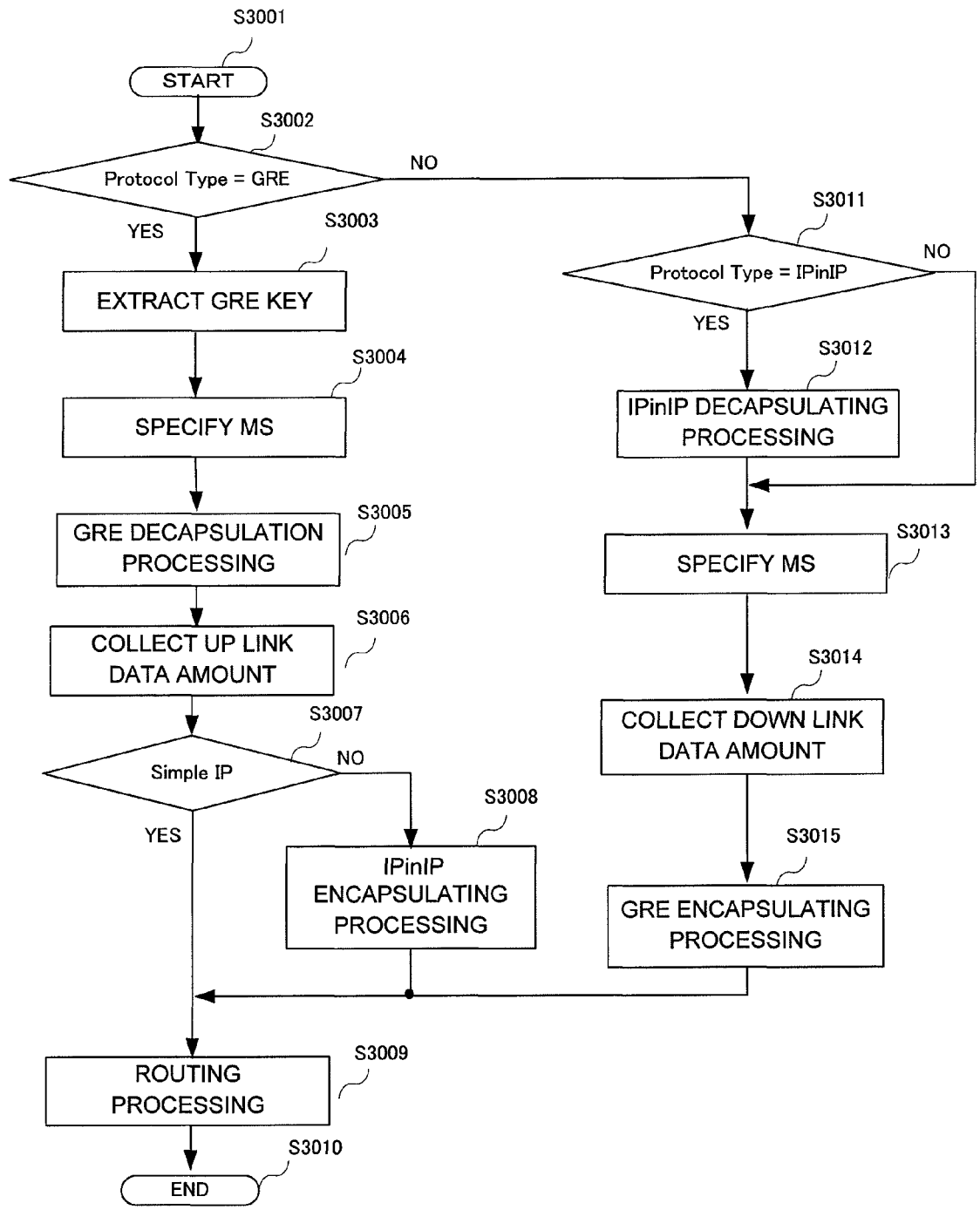
FIG. 11 is a flowchart illustrating bearer data transfer in the bearer data processing device according to an embodiment of the present invention.

The data reception leads the encapsulation/decapsulation processing unit 3015 to conduct routing processing according to a flowchart of FIG. 11.

FIG. 11 is a flowchart illustrating the bearer data transfer in the bearer data processing device according to the embodiment of the present invention. In Step 3002, the encapsulation/decapsulation processing unit 3015 determines whether a protocol type present in the IP header of the received data is GRE, or not. If yes, the operation proceeds to Step 3003 whereas if no, the operation proceeds to Step 3011. In Step 3003, the encapsulation/decapsulation processing unit 3015 extracts the GRE KEY included in the GRE header of the received data. After extraction of the GRE KEY, the operation proceeds to Step 3004. In Step 3004, the MS is specified with the use of the table in FIG. 6. For example, if the extracted GRE KEY is 0xFFFF0001, the encapsulation/decapsulation processing unit 3015 searches a row of the up link GRE KEY in FIG. 6 for searching the matched index, and acquires the matched index. Information related to the MS such as the MS IP address and the connection type are present on the row of the same index. After specifying the MS, the encapsulation/decapsulation processing unit 3015 allows the operation to proceed to Step 3005, and conducts GRE decapsulation processing to eliminate the GRE capsuling.

FIG. 13 is a diagram illustrating the GRE decapsulation processing.

In the GRE decapsulation processing, the encapsulation/decapsulation processing unit 3015 removes an IP header 7066 and a GRE header 7067 from the CRE capsuling data which is received data indicated on an upper stage of FIG. 13, extracts user data 7068, and allows the operation to proceed to Step 3006. In Step 3006, the encapsulation/decapsulation processing unit 3015 measures the number of bytes of the user data 7068, and notifies the accounting statistics collection unit 3013 of the index and the number of bytes acquired in Step 3004.

FIG. 8 is a diagram illustrating an example of a table that stores statistics information necessary for accounting in the bearer data processing device. The accounting statistics collection unit 3013 adds the notified number of bytes to the number of up link bytes in the statistics information table in FIG. 8 corresponding to the notified index, and adds +1 to the number of up link packets.

After addition, the operation proceeds to Step 3007. In Step 3007, the encapsulation/decapsulation processing unit 3015 determines whether the connection type is the simple IP or the mobile IP. If the connection type is the simple IP, the encapsulation/decapsulation processing unit 3015 transfers the user data to the I/O port 3014, and allows the operation to proceed to Step 3009. If the connection type is the mobile IP, the encapsulation/decapsulation processing unit 3015 allows the operation to proceed to IPinIP encapsulating processing S3008 of Step 3008.

Figure 7A:
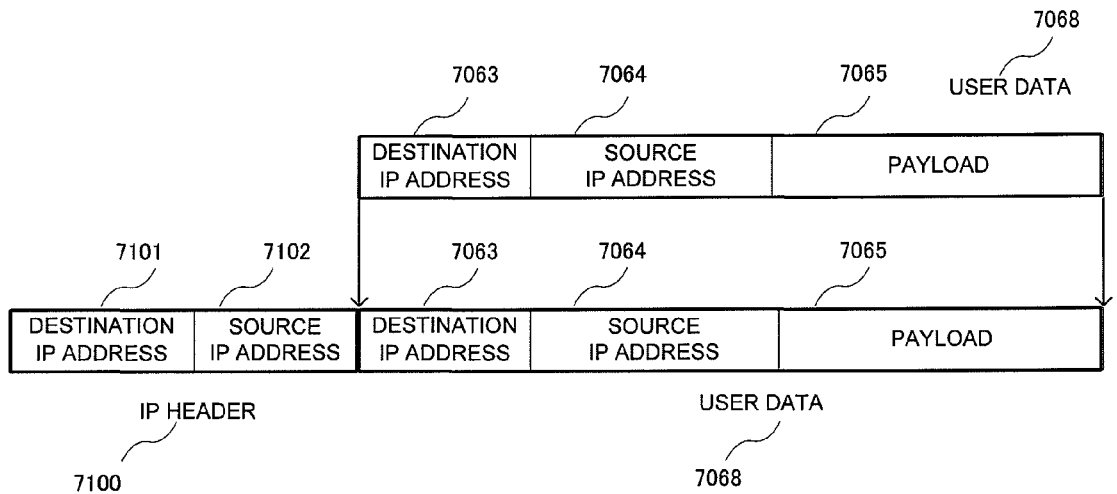
FIGS. 7A and 7B are diagrams illustrating an IPinIP encapsulation processing and decapsulation processing.

FIG. 7A is a diagram illustrating the IPinIP encapsulation processing.

In the IPinIP encapsulation processing, an IP header 7100 is allocated to the user data 7068 extracted in the GRE decapsulating processing capsulation processing 3005 indicated on an upper stage of FIG. 7A. The HA IP address is set to the destination IP address 7101 of the allocated IP header, and the IP address of the GW-EP 301 is set to a source IP address 7102. After conducting the IPinIP encapsulating processing, the encapsulation/decapsulation processing unit 3015 transfers the user data to the I/O port 3014, and allows the operation to proceed to Step 3009. In Step 3009, the encapsulation/decapsulation processing unit 3015 conducts appropriate routing processing, and transmits the data to the network 5002. If the network 5002 is connected to the internet 501, the data is transferred to the internet 501 in conformity with a normal IP routing.

On the other hand, when the user data of down link which is transmitted from the internet 501 to the MS 700 arrives at the GW-EP 301, the user data is transferred to the encapsulation/decapsulation processing unit 3015 through the I/O port 3014, and the routing processing of FIG. 11 is executed. In Step 3002, the encapsulation/decapsulation processing unit 3015 checks whether the protocol type of the IP header is the GRE, or not. Because the data received from the internet 501 is not the GRE capsuling data, the determination is no, and the operation proceeds to Step 3011. In Step 3011, the encapsulation/decapsulation processing unit 3015 checks whether the protocol type of the IP header is IPinIP, or not. This is different depending on whether the connection type is the mobile IP or the simple IP, and if the connection type is the mobile IP, the check determination is yes, and the operation proceeds to IPinIP decapsulation processing in Step 3012.

Figure 7B:
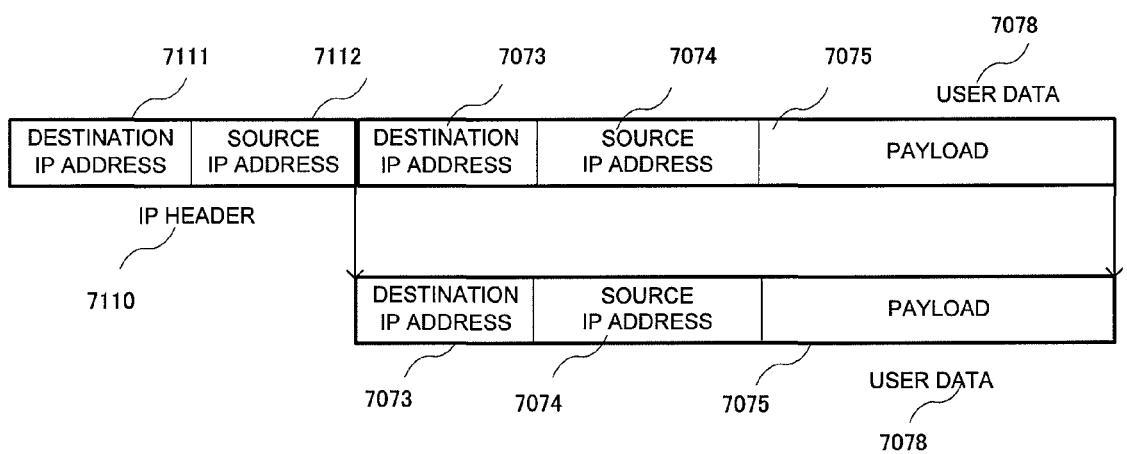

FIG. 7B is a diagram illustrating the IPinIP decapsulation processing.

In the IPinIP decapsulation processing, the encapsulation/decapsulation processing unit 3015 removes an IP header 7110 from an IPinIP packet indicated on an upper stage of FIG. 7B, and extracts user data 7078. After extraction of the user data, the operation proceeds to Step 3013. In the encapsulation/decapsulation processing unit 3015, if the connection type is the simple IP, the determination in Step 3011 is no, and the operation proceeds to Step 3013. In Step 3013, the encapsulation/decapsulation processing unit 3015 searches the IP address that matches the destination address of the IP header from the table of FIG. 6. If there is the matched IP address, the encapsulation/decapsulation processing unit 3015 acquires the index corresponding to the matched MS IP address, and allows the operation to proceed to Step 3014. In Step 3014, the encapsulation/decapsulation processing unit 3015 measures the number of bytes of the received data for statistics collection that is a base of accounting, and notifies the accounting statistics collection unit 3013 of the number of bytes and the index acquired in Step 3013. The accounting statistics collection unit 3013 adds the notified number of bytes to the number of down link bytes in the table of FIG. 8, which corresponds to the index number, and increments the counter of the number of down link packets by +1. Upon completion of down link data amount collection 3014, the operation proceeds to Step 3015.

Figure 14:
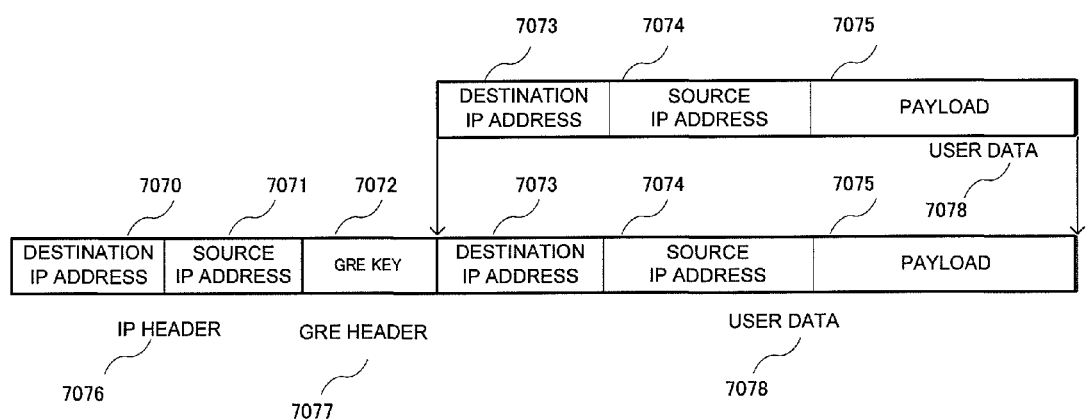
FIG. 14 is a diagram illustrating encapsulation processing.

FIG. 14 is a diagram illustrating GRE encapsulation processing.

In the GRE encapsulation processing of Step 3015, the encapsulation/decapsulation processing unit 3015 allocates a GRE header 7077 and an IP header 7076 to the received user data 7078 as illustrated in FIG. 14. The GRE KEY of the GRE header 7077 allocates the down link GRE KEY corresponding to the index acquired in Step 3013. Upon completion of the GRE encapsulation processing, the encapsulation/decapsulation processing unit 3015 transfers the GRE capsuling data to the I/O port 3014, and allows the operation to proceed to Step S3009. In Step 3009, the encapsulation/decapsulation processing unit 3015 transfers the data to the BS 600 according to the routing information.

The BS 600 transfers the data received from the GW-EP 301 to the MS 700 as the radio data 7100.

Subsequently, a disconnection sequence will be described.

Figure 15:
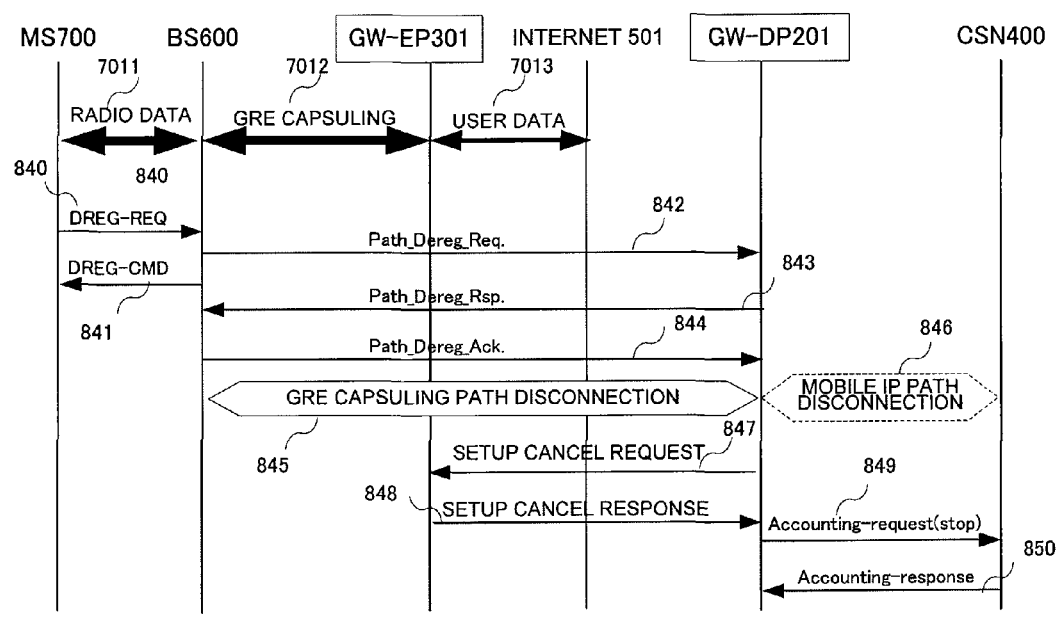
FIG. 15 is a sequence diagram illustrating disconnection processing according to an embodiment of the present invention.

FIG. 15 is a diagram illustrating an example of the disconnection sequence.

When the connection is to be disconnected, the MS 700 transmits a DRG-REQ 840 that is a request for disconnection to the BS 600. The reception of the DRG-REQ 840 leads the BS 600 to execute a disconnection sequence (Path_Dereg_Req. 842, Path_Dereg_Rsp. 843, Path_Dereg_Ack 844) between the BS 600 and the GW-DP 201. The GW-DP 201 conducts the disconnection sequence from the BS 600, and at the same time, if the connection type is the mobile IP, disconnects a mobile IP path 846 from the CSN 400. The GW-DP 201 transmits a setup cancel request 847 to the GW-EP 301. A format of the setup cancel request 847 is identical with the format of the setup request illustrated in FIG. 12, and whether the format is of the setup request or the setup cancel request is distinguished by the contents of the type 8313. The information elements 8310 of the setup cancel request include the MS IP addresses, and the control unit 3011 of the GW-EP 301 that receives the setup cancel request 847 searches the table in FIG. 6, and clears information on the matched index. After clearing, the control unit 3011 acquires the number of down link bytes, the number of up link bytes, the number of down link packets, and the number of up link packets in FIG. 8 corresponding to the index, from the accounting statistics collection unit 3013 of the GW-EP 301, sets those acquired numbers for the information elements 8310 of a setup cancel response 848, and transmits the information elements 8310 to the GW-DP 201.

The GW-DP 201 that has received the setup cancel response 848 extracts the number of down link bytes, the number of up link bytes, the number of down link packets, and the number of up link packets, which are stored in the setup cancel response 848, and stores those extracted numbers in a given attribute of an Accounting-Request (stop) 849, and transmits the stored numbers to the CSN 400. Upon receiving the accounting-Request (stop) 849, the CSN 400 transmits an Accounting-Response 850 to the GW-DP 201.

Because the MS 700 can access to the GW-EP 301 connected to the network 5002 close to the BS 600 through the internet 501, traffic can be prevented from being converted on the network 5001. Also, during disconnection, the statistics information is transmitted from the GW-EP to the GW-DP 200, to thereby enable information necessary for accounting to be notified the CSN 400 of.

B. Second Embodiment

In a second embodiment, a description will be given of another method of the BS management table in the GW-EP search flowchart of FIG. 10. FIG. 16 illustrates a table held by the EP-GW position management unit 2004 in the GW-DP 201 of FIG. 2. This table includes items of the index, the BS network address, and the area, and specifies the area for each of the BS network addresses. The connection sequence of the MS is the sequence of FIG. 9 which is identical with that of the first embodiment. The GW-DP 201 receives the MS_PreAttachment_Req. 801 transmitted from the BS 600 to implement the GW-EP search processing 830.

FIG. 10 is a flowchart illustrating allocation processing of the bearer data processing device according to the embodiment of the present invention. In the GW-EP search processing 830, the flowchart of FIG. 10 is implemented, and in Step 2002, the GW-DP 201 extracts the BS IP address of the MS_PreAttachment_Req. 801 in the same method as that of the first embodiment. For example, it is assumed that the BS IP address extracted in Step 2002 is 192.168.20.25. Upon completion of the extraction, the GW-DP 201 allows the operation to proceed to Step 2003, and specifies the area. The table of FIG. 16 is used for specifying the area.

FIG. 16 is a diagram illustrating an example of the BS position management table according to the embodiment of the present invention. Areas corresponding to the BS network addresses are set in the table of FIG. 16. When the BS IP address is 192.168.20.25, it is found by searching a BS network address column that the BS IP address is included in a network address of 192.168.20.0/24 in index 2. The area on the same row as that of the matched index is an obtained area. In the case of the index 2, an area 2 is obtained. After the area could be specified, the GW-DP 201 allows the operation to proceed to Step 2004, and the subsequent steps are identical with those in the first embodiment.

The advantage of the second embodiment resides in that the BS IP network address can be used as the BS management table to reduce the number of table setting.

C. Third Embodiment

In a third embodiment, a description will be given of another method in the GW-EP search processing of FIG. 9.

Figure 17:
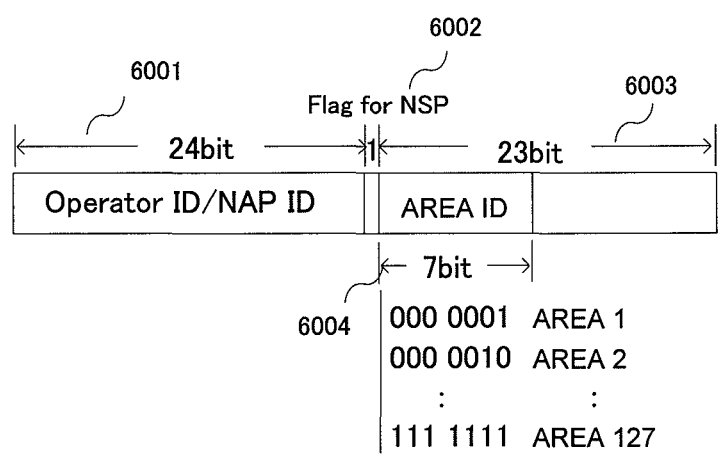
FIG. 17 is a diagram illustrating a format of a BSID according to an embodiment of the present invention.

FIG. 17 illustrates a format of a BSID. The BSID is an identifier specified for identifying the BS, and in this example, has a length of 48 bits. High-order 24 bits 6001 are specified by an operator ID or an NAP ID and the standards of WiMAX forum. Low-order 24 bits can be used for identifying the BS. A first bit 6002 is specified as a determination flag to determine whether low-order 23 bits are intended for an NSP or for identifying the BS. In the third embodiment, 7 bits of 23 bits 6003 used for the BS identification are used as an area ID 6004. The 7 bits used as the area ID are made to match the area number. For example, when the area ID is 0000001, the area ID indicates an area 1.

The MS connection sequence in the third embodiment will be described with reference to FIG. 9. As in the first embodiment, the GW-DP 201 receives the MS_PreAttachment_Req. 801 transmitted from the BS 600 to implement the GW-EP search processing 830. The MS_PreAttachment_Req. 801 includes the BSID.

Figure 18:
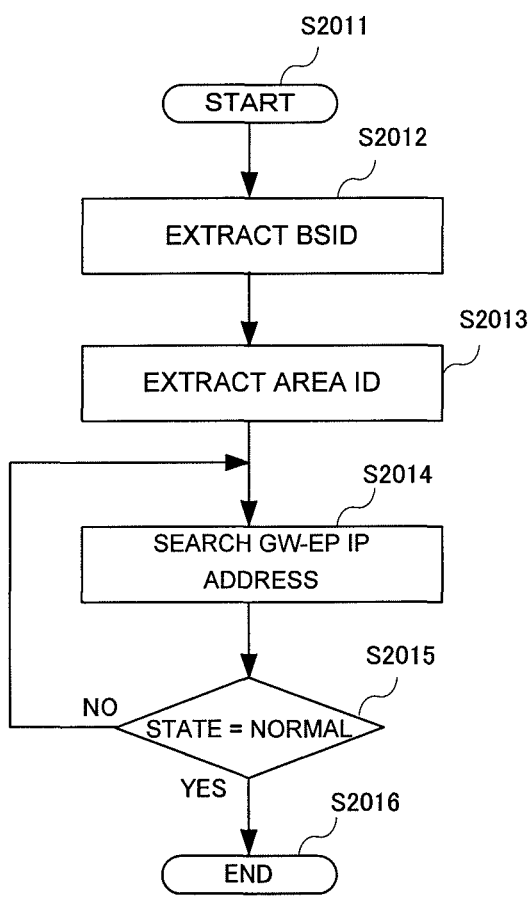
FIG. 18 is a flowchart illustrating the allocation processing in the bearer data processing device according to an embodiment of the present invention.

FIG. 18 is a flowchart illustrating the allocation processing in the bearer data processing device according to the embodiment of the present invention. In the GW-EP search processing 830, the flowchart of FIG. 18 is implemented. In Step 2012, the GW-DP 201 extracts the BSID. In the MS_PreAttachment_Req. 801, the BSID is included in the message, and the GW-DP 201 extracts the BSID of 48 bits. As an example, it is assumed that the extracted BSID is 000100 010345 (HEX). After extraction of the BSID, the operation proceeds to Step 2013. It is found that the bit corresponding to the area ID of the above-mentioned extracted BSID is 01, and it is found that the BS is located in the area 1. After specifying the area, the GW-DP 201 specifies the GW-EP IP address with the use of the table 5 in FIG. 5 as in the first embodiment. Thereafter, the same processing as that in the first embodiment is conducted.

The advantage of the third embodiment resides in that the BS management information can be reduced by setting the area information for the BSID.

D. Fourth Embodiment

In a fourth embodiment, a description will be given of another method in the GW-EP search processing of FIG. 9.

FIG. 19 illustrates a table held by the EP-GW position management unit 2004 in the GW-DP 201 of FIG. 2. The table includes items of the index, the BS IP address, and the GW-EP IP address.

The connection sequence of the MS is the sequence of FIG. 9 which is identical with that of the first embodiment. The GW-DP 201 receives the MS_PreAttachment_Req. 801 transmitted from the BS 600 to implement the GW-EP search processing 830.

Figure 20:
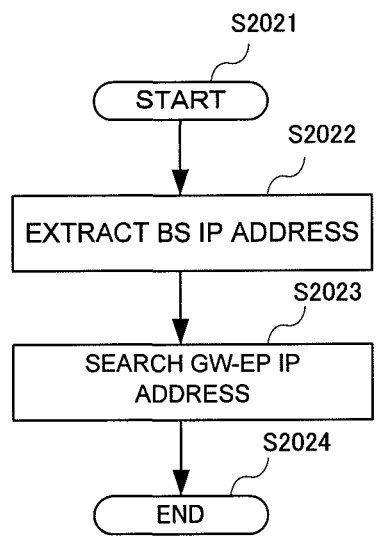
FIG. 20 is a flowchart illustrating the allocation processing in the bearer data processing device according to an embodiment of the present invention.

FIG. 20 is a flowchart illustrating the allocation processing in the bearer data processing device according to the embodiment of the present invention. In the GW-EP search processing 830, the flowchart of FIG. 20 is implemented. In Step 2022, the GW-DP 201 extracts the BSIP in the same method as that of the first embodiment. After extraction of the BSIP address, the operation proceeds to Step 2023. In Step 2023, the GW-DP 201 searches the extracted BSIP address on a column of the BSIP address of the table in FIG. 19, and acquires the GW-EP IP address on the same row as that of the matched index. For example, when the BS IP address is 192.168.10.2, the BS IP address matches an index 1, and acquires a corresponding GW-EP IP address 192.168.200.10. After acquiring the GW-EP IP address, the GW-DP 201 allows the operation to proceed to Step 2034, and executes the sequence of FIG. 9 as in the same manner as that of the first embodiment.

Figure 22:
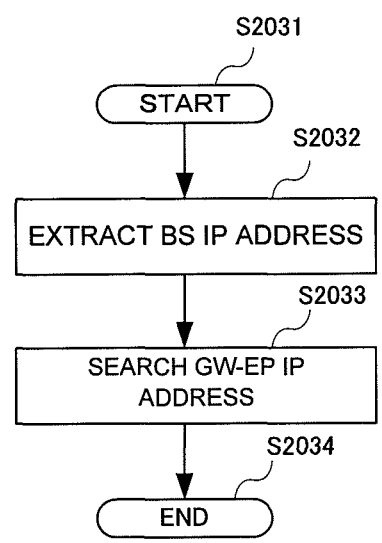
FIG. 22 is a flowchart illustrating the allocation processing in the bearer data processing device according to an embodiment of the present invention.
Figure 23:
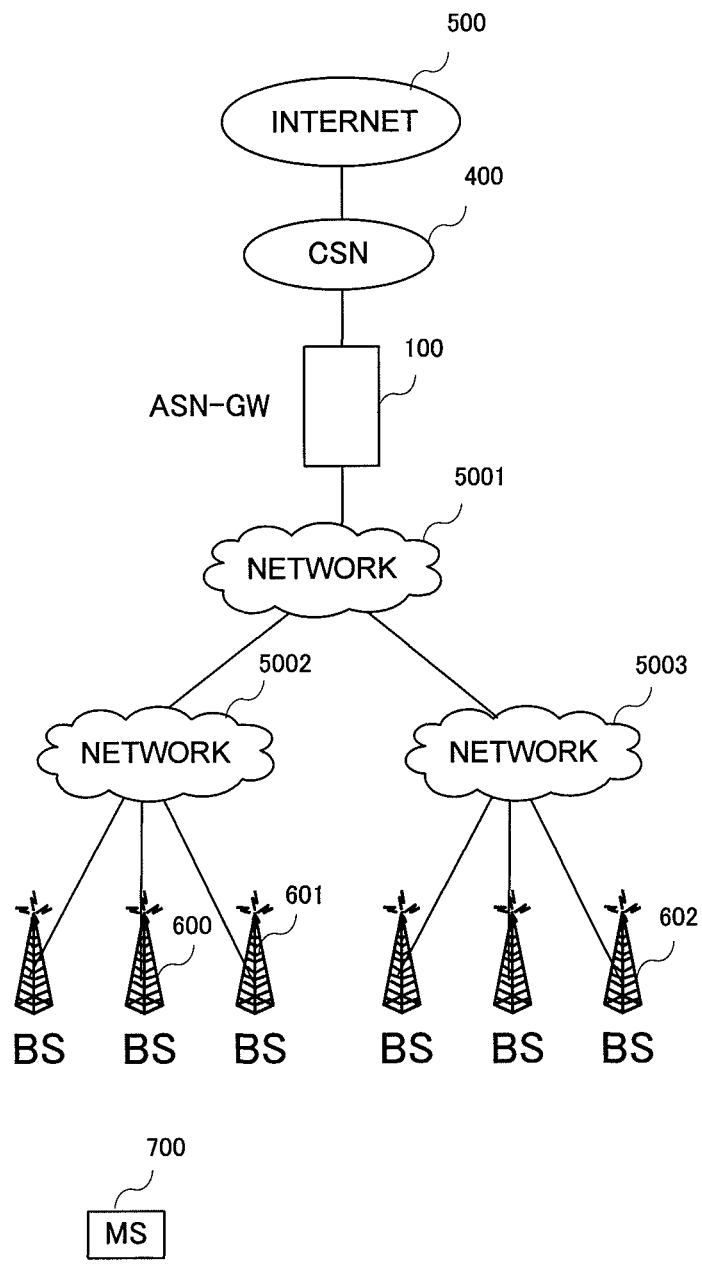
FIG. 23 is a schematic diagram of a WiMAX system which is one of the mobile communication systems.
Figure 24:
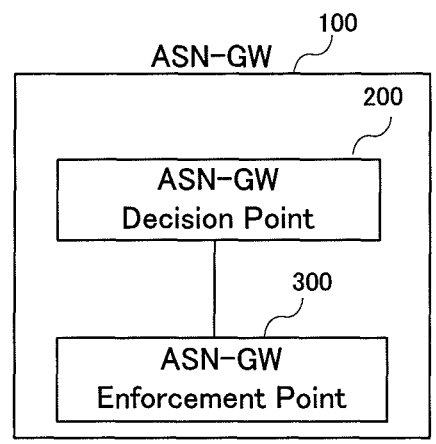
FIG. 24 is a schematic diagram of a function of an ASN-GW in the WiMAX system.
Figure 25:
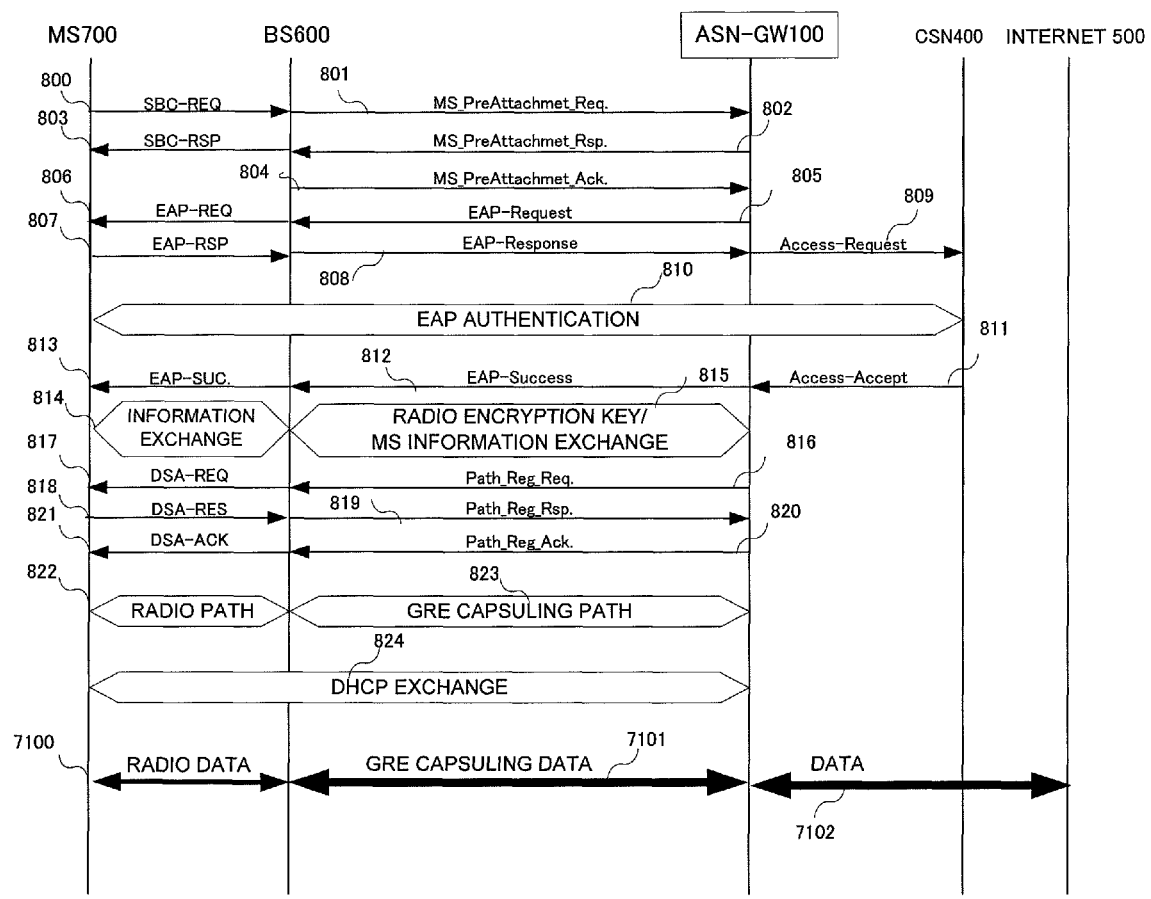
FIG. 25 is a diagram illustrating a connection sequence of the WiMAX.
Figure 26:
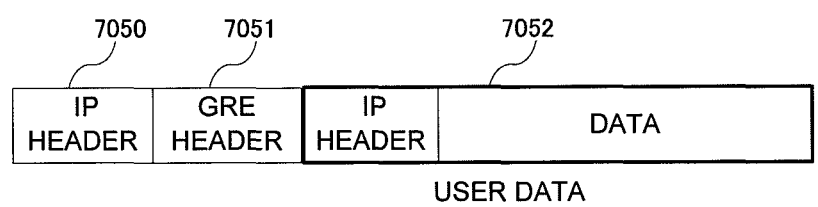
FIG. 26 is a diagram illustrating a packet format of GRE capsuling data.

Also, as the same BS management method, the management can be achieved by the BSID instead of the BS IP address. FIG. 21 illustrates a management table that associates the BSID with the GW-EP IP address. Also, FIG. 22 illustrates a GW-EP search flowchart. A difference from FIG. 20 resides in that the GW-EP address is searched on the basis of the BSID.

The GW-EP and/or the GW-DP can be configured by using an appropriate router or computer.

Also, the present invention has been described by exemplifying the GW-EPs and the GW-DP, but can be applied to an appropriate bearer data processing device or signaling processing device. The present invention is not limited to the GRE and the GRE KEY, but can be applied to appropriate encapsulation/decapsulation and a key (capsuling key) necessary for the encapsulation/decapsulation.

What is claimed is:

1. A wireless communication system comprising a hierarchical structure such that a plurality of base stations are connected to a gateway through a network, and each of the plurality of base stations communicates with a plurality of wireless terminals, wherein
    the gateway includes a signaling processing device for processing signaling, and one or a plurality of bearer data processing devices for processing bearer data,
    the plurality of base stations, the network, and one or a plurality of the bearer data processing devices are defined as one area,
    one signaling processing device is concentrated for a plurality of the areas,
    the signaling processing device includes a position management table indicating which area each of the base stations is located in, and which area the bearer data processing devices are set with respect to the areas in which the respective base stations are located,
    the signaling processing device allocates the bearer data processing device to the area in which a base station is located in response to a connection request from any one of the wireless terminals,
    each of the bearer data processing devices has an information table that stores wireless terminal addresses, base station addresses, and capsulation key information necessary for encapsulating and decapsulating in association with each other,
    each of the bearer data processing devices is located on the basis of the area in which the base stations are located, and communicates the bearer data with one or the plurality of base stations within the area,
    each of the base stations transmits the connection request including base station identification information to the signaling processing device according to a request from the wireless terminal,
    upon receiving the connection request, the signaling processing device refers to the position management table, and executes bearer data processing device search processing for specifying a bearer data processing device address of the bearer data processing device connected to the base station on the basis of the base station identification information included in the connection request,
    the signaling processing device transmits an address to be allocated to the wireless terminal to the base station,
    the signaling processing device transmits the bearer data processing device address of the bearer data processing device specified by the bearer data processing device search to the base station,
    the signaling processing device and the bearer data processing device exchange the capsulation key information necessary for encapsulating and decapsulating between the base station and the bearer data processing device,
    the signaling processing device transmits a setup request including the wireless terminal address, the base station address, and the capsulation key address to the bearer data processing device in which the capsulation key information is specified by the bearer data processing device search, and
    the bearer data processing device sets the wireless terminal address, the base station address, and the capsulation key information to the information table according to the setup request received from the signaling processing device, and completes a connection of a capsulation path between the base station and the bearer data processing device.

2. The wireless communication system according to claim 1, wherein
    the bearer data processing device has a statistics table that stores statistics information representing the amount of data of up link and down link in correspondence with the wireless terminal addresses, and
    when data of up link from the wireless terminal is transmitted, or when data of down link to the wireless terminal is received, the bearer data processing device measures the amount of transmitted or received data, and adds the amount of data of up link or down link corresponding to the wireless terminal address of the statistics table.

3. The wireless communication system according to claim 2, wherein
    when receiving a disconnection request from the wireless terminal, the signaling processing device executes a disconnection sequence with the base station, and transmits a setup cancel request including the wireless terminal address to the bearer data processing device, and
    when receiving the setup cancel request, the bearer data processing device clears a corresponding entry with reference to the information table according to the wireless terminal address included in the setup cancel request, acquires the statistics information corresponding to the wireless terminal address with reference to the statistics table, and transmits an information element of a setup cancel response with the inclusion of the statistics information to the signaling processing device.

4. The wireless communication system according to claim 1, wherein
    the position management table further includes state information indicative of whether the bearer data processing device is normal or failure, with respect to the respective bearer data processing device addresses,
    the signaling processing device, in the bearer data processing device search processing, refers to the position management table, uses the bearer data processing device if the searched bearer data processing device is normal, and searches another bearer data processing device address if the searched bearer data processing device is failure.

5. The wireless communication system according to claim 1, wherein
the position management table further includes:
a first table that stores the areas in association with the base station addresses; and
a second table that stores the bearer data processing device addresses in association with the areas, and
in the bearer data processing device search processing, when receiving the connection request, the signaling processing device specifies the base station address according to a source address of the connection request, specifies the area in which the base station is located with the use of the first table, and acquires the bearer data processing device address on the basis of the specified area with the use of the second table.

6. The wireless communication system according to claim 1, wherein
the position management table further includes:
a first table that stores the areas in association with base station IP network addresses; and
a second table that stores the bearer data processing device addresses in association with the areas, and
in the bearer data processing device search processing, when receiving the connection request, the signaling processing device specifies the base station address according to a source address of the connection request, specifies the area in which the base station is located with the use of the first table, and acquires the bearer data processing device address on the basis of the specified area with the use of the second table.

7. The wireless communication system according to claim 1, wherein
the position management table further includes a first table that stores the bearer data processing device addresses in association with area IDs,
a region that specifies the area is provided in a base station identifier that specifies the base station, and the area ID that specifies the area is allocated to the region, in the connection request that is received by the bearer data processing device from the base station, and
in the bearer data processing device search processing, when receiving the connection request, the signaling processing device extracts the area ID in which the base station is located from the base station identifier included in the connection request, and acquires the bearer data processing device address on the basis of the extracted area ID with the use of the first table.

8. The wireless communication system according to claim 1, wherein
the position management table further includes a first table that stores the bearer data processing device addresses in association with the base station addresses or base station identifiers that specify the base stations,
in the bearer data processing device search processing, when receiving the connection request, the signaling processing device specifies the base station address or the base station identifier according to a source address of the connection request, and acquires the bearer data processing device address with the use of the first table.

9. A wireless communication method in a wireless communication system comprising a hierarchical structure such that a plurality of base stations are connected to a gateway through a network, and each of the plurality of base stations communicates with a plurality of wireless terminals, wherein
the gateway includes a signaling processing device for processing signaling, and one or a plurality of bearer data processing devices for processing bearer data,
the plurality of base stations, the network, and one or a plurality of the bearer data processing devices are defined as one area,
one signaling processing device is concentrated for a plurality of the areas,
the signaling processing device includes a position management table indicating which area each of the base stations is located in, and which area the bearer data processing devices are set with respect to the areas in which the respective base stations are located,
the signaling processing device allocates the bearer data processing device to the area in which a base station is located in response to a connection request from any one of the wireless terminals,
each of the bearer data processing devices has an information table that stores wireless terminal addresses, base station addresses, and capsulation key information necessary for encapsulating and decapsulating in association with each other,
each of the bearer data processing devices is located on the basis of the area in which the base stations are located, and communicates the bearer data with one or the plurality of base stations within the area,
each of the base stations transmits the connection request including base station identification information to the signaling processing device according to a request from the wireless terminal,
upon receiving the connection request, the signaling processing device refers to the position management table, and executes bearer data processing device search processing for specifying a bearer data processing device address of the bearer data processing device connected to the base station on the basis of the base station identification information included in the connection request,
the signaling processing device transmits an address to be allocated to the wireless terminal to the base station,
the signaling processing device transmits the bearer data processing device address of the bearer data processing device specified by the bearer data processing device search to the base station,
the signaling processing device and the bearer data processing device exchange the capsulation key information necessary for encapsulating and decapsulating between the base station and the bearer data processing device,
the signaling processing device transmits a setup request including the wireless terminal address, the base station address, and the capsulation key address to the bearer data processing device in which the capsulation key information is specified by the bearer data processing device search, and
the bearer data processing device sets the wireless terminal address, the base station address, and the capsulation key information to the information table according to the setup request received from the signaling processing device, and completes a connection of a capsulation path between the base station and the bearer data processing device.

10. The wireless communication method according to claim 9, wherein
the bearer data processing device has a statistics table that stores statistics information representing the amount of data of up link and down link in correspondence with the wireless terminal addresses, and
when data of up link from the wireless terminal is transmitted, or when data of down link to the wireless terminal is received, the bearer data processing device measures the amount of transmitted or received data, and adds the amount of data of up link or down link corresponding to the wireless terminal address of the statistics table.

11. The wireless communication method according to claim 10, wherein when receiving a disconnection request from the wireless terminal, the signaling processing device executes a disconnection sequence with the base station, and transmits a setup cancel request including the wireless terminal address to the bearer data processing device, and when receiving the setup cancel request, the bearer data processing device clears a corresponding entry with reference to the information table according to the wireless terminal address included in the setup cancel request, acquires the statistics information corresponding to the wireless terminal address with reference to the statistics table, and transmits an information element of a setup cancel response with the inclusion of the statistics information to the signaling processing device.

12. The wireless communication method according to claim 9, wherein the position management table further includes state information indicative of whether the bearer data processing device is normal or failure, with respect to the respective bearer data processing device addresses, the signaling processing device, in the bearer data processing device search processing, refers to the position management table, uses the bearer data processing device if the searched bearer data processing device is normal, and searches another bearer data processing device address if the searched bearer data processing device is failure.

13. A gateway in a wireless communication system comprising a hierarchical structure such that a plurality of base stations are connected to the gateway through a network, and each of the plurality of base stations communicates with a plurality of wireless terminals, wherein the gateway includes a signaling processing device for processing signaling, and one or a plurality of bearer data processing devices for processing bearer data, the plurality of base stations, the network, and one or a plurality of the bearer data processing devices are defined as one area, one signaling processing device is concentrated for a plurality of the areas, the signaling processing device includes a position management table indicating which area each of the base stations is located in, and which area the bearer data processing devices are set with respect to the areas in which the respective base stations are located, the signaling processing device allocates the bearer data processing device to the area in which a base station is located in response to a connection request from any one of the wireless terminals, each of the bearer data processing devices has an information table that stores wireless terminal addresses, base station addresses, and capsulation key information necessary for encapsulating and decapsulating in association with each other, each of the bearer data processing devices is located on the basis of the area in which the base stations are located, and communicates the bearer data with one or the plurality of base stations within the area, from each of the base stations, the connection request including base station identification information is transmitted to the signaling processing device according to a request from the wireless terminal, upon receiving the connection request, the signaling processing device refers to the position management table, and executes bearer data processing device search processing for specifying a bearer data processing device address of the bearer data processing device connected to the base station on the basis of the base station identification information included in the connection request, the signaling processing device transmits an address to be allocated to the wireless terminal to the base station, the signaling processing device transmits the bearer data processing device address of the bearer data processing device specified by the bearer data processing device search to the base station, the signaling processing device and the bearer data processing device exchange the capsulation key information necessary for encapsulating and decapsulating between the base station and the bearer data processing device, the signaling processing device transmits a setup request including the wireless terminal address, the base station address, and the capsulation key address to the bearer data processing device in which the capsulation key information is specified by the bearer data processing device search, and the bearer data processing device sets the wireless terminal address, the base station address, and the capsulation key information to the information table according to the setup request received from the signaling processing device, and completes a connection of a capsulation path between the base station and the bearer data processing device.

* * * * *